United States Patent
Lyubarsky

(10) Patent No.: US 12,556,668 B2
(45) Date of Patent: Feb. 17, 2026

(54) ILLUMINATION SOURCE HAVING ILLUMINATION DEVICES AND OPTICAL COMBINING ELEMENTS

(71) Applicant: TEXAS INSTRUMENTS INCORPORATED, Dallas, TX (US)

(72) Inventor: Alexander Lyubarsky, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/667,155

(22) Filed: May 17, 2024

(65) Prior Publication Data

US 2025/0358393 A1    Nov. 20, 2025

(51) Int. Cl.
*H04N 9/31* (2006.01)
*G03B 21/20* (2006.01)

(52) U.S. Cl.
CPC ....... *H04N 9/3158* (2013.01); *G03B 21/2013* (2013.01); *G03B 21/2033* (2013.01); *H04N 9/3164* (2013.01)

(58) Field of Classification Search
CPC ...... H04N 9/3158; H04N 9/3164; F21V 9/14; F21V 9/20; G03B 21/2013; G03B 21/2033; G03B 21/2066; G03B 21/208
See application file for complete search history.

(56) References Cited

U.S. PATENT DOCUMENTS

| | | | |
|---|---|---|---|
| 6,356,577 B1 * | 3/2002 | Miller | G02B 27/143 372/100 |
| 11,852,962 B2 * | 12/2023 | Weng | G02B 19/0028 |
| 2012/0081679 A1 * | 4/2012 | Matsumoto | G03B 33/12 353/98 |
| 2013/0100974 A1 * | 4/2013 | Janssens | G03B 21/2013 362/235 |
| 2014/0354956 A1 * | 12/2014 | Yamada | H04N 9/3164 353/20 |
| 2016/0116832 A1 * | 4/2016 | Wang | F21V 9/14 353/20 |
| 2017/0351167 A1 * | 12/2017 | Wu | F21V 7/0066 |
| 2019/0339602 A1 * | 11/2019 | Pan | G03B 21/2033 |
| 2020/0201162 A1 * | 6/2020 | Sudo | F21S 2/00 |
| 2021/0132481 A1 * | 5/2021 | Horie | H04N 9/3158 |
| 2021/0240064 A1 * | 8/2021 | Chang | G03B 21/2013 |
| 2021/0243415 A1 * | 8/2021 | Chen | G03B 21/2066 |

* cited by examiner

*Primary Examiner* — Alexander K Garlen
(74) *Attorney, Agent, or Firm* — Michael T. Gabrik; Frank D. Cimino

(57) ABSTRACT

An apparatus includes a housing having opposing first and second surfaces. A first illumination device produces first light, a second illumination device produces second light, and a third illumination device produces third light. The first, second, and third illumination devices are arranged along the first surface. The first light has a first color, the second light has a second color, and the third light has a third color. The first color is different than the second color and the third color, and the second color is different than the third color. A fourth illumination device produces fourth light, a fifth illumination device produces fifth light, and a sixth illumination device produces sixth light. The fourth, fifth, and sixth illumination devices are arranged along the second surface. The fourth light has the first color, the fifth light has the second color, and the sixth light has the third color.

20 Claims, 14 Drawing Sheets

ILLUMINATION SOURCE HAVING ILLUMINATION DEVICES AND OPTICAL COMBINING ELEMENTS

BACKGROUND

Projection systems include an illumination source. Light produced by the illumination source may pass through optics to a spatial light modulator (SLM), e.g., a digital micromirror device, a liquid crystal display (LCD), liquid crystal on silicon (LCoS), etc. The SLM may manipulate the light spatially across the surface of the SLM. Such systems can be used for video projection, holography, optical data processing, etc.

SUMMARY

In one example, an apparatus includes a housing having a first surface and a second surface opposite the first surface. A first illumination device is configured to produce first light, a second illumination device is configured to produce second light, and a third illumination device is configured to produce third light. The first, second, and third illumination devices are arranged along the first surface. The first light has a first color, the second light has a second color, and the third light has a third color. The first color is different than the second color and the third color, and the second color is different than the third color. A fourth illumination device is configured to produce fourth light, a fifth illumination device is configured to produce fifth light, and a sixth illumination device is configured to produce sixth light. The fourth, fifth, and sixth illumination devices are arranged along the second surface. The fourth light has the first color, the fifth light has the second color, and the sixth light has the third color.

In another example, an apparatus includes a first illumination assembly having a first illumination device configured to produce first light, a second illumination device configured to produce second light, and a third illumination device configured to produce third light. The first light has a first color, the second light has a second color, and the third light has a third color. The first color is different than the second color and the third color, and the second color is different than the third color. A second illumination assembly has a fourth illumination device configured to produce fourth light, a fifth illumination configured to produce fifth light, and a sixth illumination device configured to produce sixth light. The fourth light has the first color. The fifth light has the second color. The sixth light has the third color. The second illumination assembly faces the first illumination assembly. A third illumination assembly has a seventh illumination device configured to produce seventh light, an eighth illumination device configured to produce eighth light, and a ninth illumination device configured to produce ninth light. The seventh light has the first color. The eighth light has the second color. The ninth light has the third color. The third illumination assembly is adjacent the first and second illumination assemblies.

In yet another example, a projection system includes a spatial light modulator and a light source apparatus configured to produce light to the spatial light modulator. The light source apparatus includes a housing having a first surface and a second surface opposite the first surface. A first illumination device is configured to produce first light, a second illumination device configured to produce second light, and a third illumination device configured to produce third light. The first, second, and third illumination devices are arranged along the first surface. The first light has a first color, the second light has a second color, and the third light has a third color. The first color is different than the second color and the third color, and the second color is different than the third color. A fourth illumination device is configured to produce fourth light, a fifth illumination device is configured to produce fifth light, and a sixth illumination device is configured to produce sixth light. The fourth, fifth, and sixth illumination devices are arranged along the second surface. The fourth light has the first color, the fifth light has the second color, and the sixth light has the third color.

DETAILED DESCRIPTION

Figure 1:
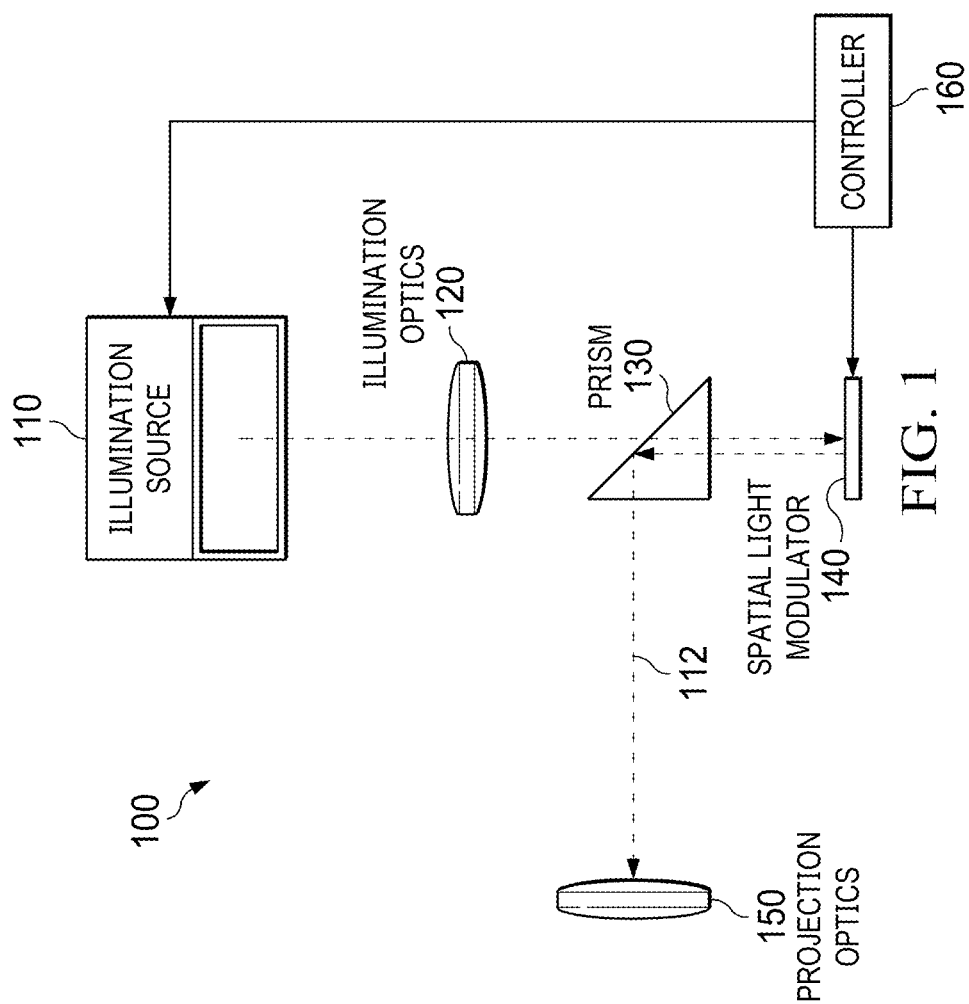
FIG. 1 is a system diagram of a projection system including an illumination source and a spatial light modulator, in an example.

The same reference numbers or other reference designators are used in the drawings to designate the same or similar (either by function and/or structure) features.

A light source for a projection system produces light of a particular maximum intensity. Some projection systems benefit from particularly high intensity light sources. Unfortunately, higher intensity light sources may be relatively large and an undesirable option in space-constrained applications.

FIG. 1 is a system diagram of a projection system 100 including an illumination source 110 (or simply illumination source 110), illumination optics 120, a prism 130, a spatial light modulator (SLM) 140, projection optics 150, and a controller 160. Light 112 from illumination source 110 passes through illumination optics 120, and prism 130 and to the SLM 140, which modulates the light. SLM 140 may include any suitable SLM such as a digital micromirror device, a liquid crystal on silicon (LCoS) spatial light modulator, or a transmissive liquid crystal display (LCD). Projection optics 150 receives the light from SLM 140 via prism 130 and focuses the spatially-modulated light onto a light receiving medium, e.g., a projection screen. A controller 160 may be coupled to SLM 140 to control the operation of the SLM 140 to produce images and to the illumination source 110 to control the illumination source. Controller 160 may receive digital data based on the images to be produced by SLM 140 and controls the SLM 140 based on the digital data.

Figure 2A:
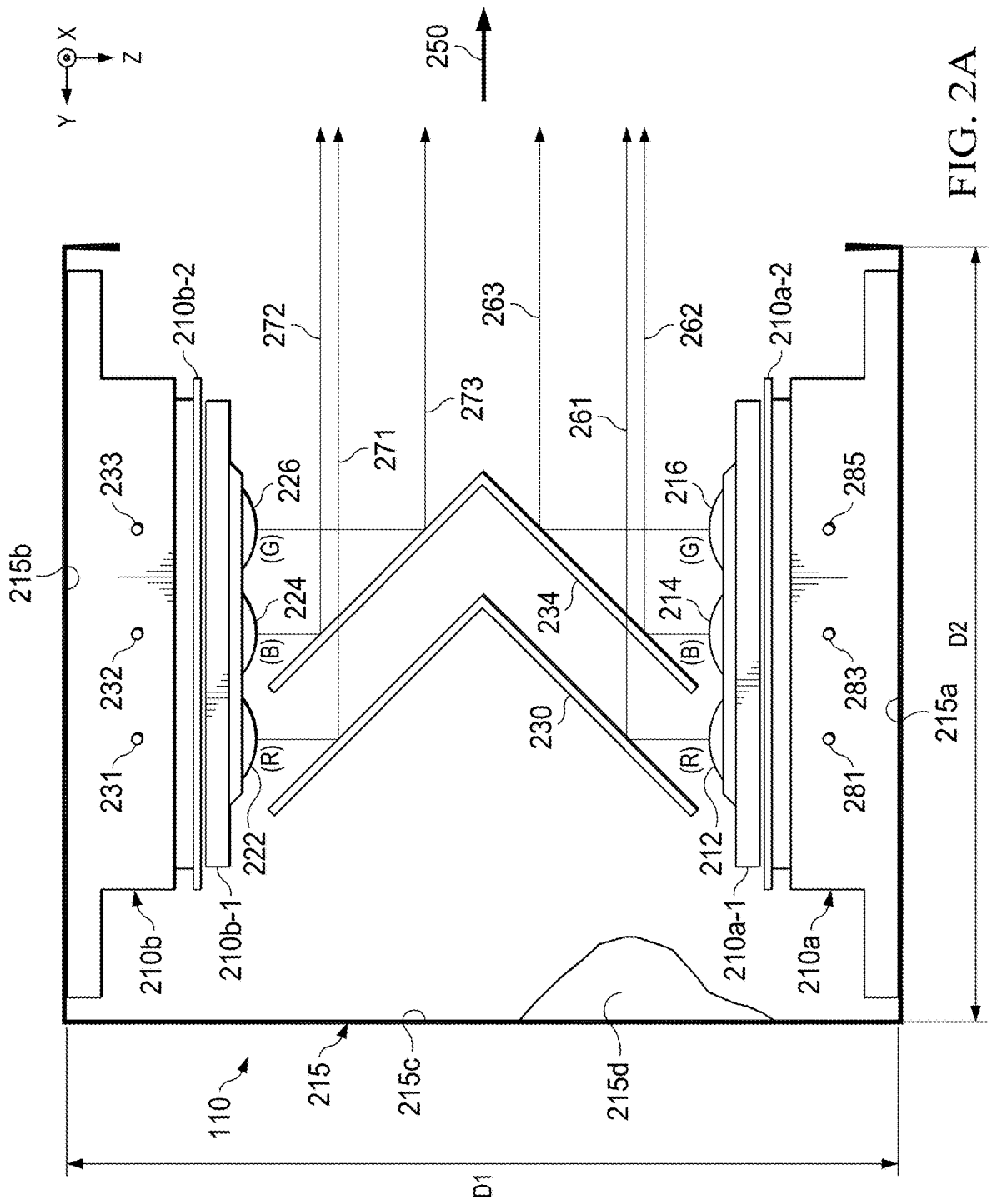
FIG. 2A is a top view of an illumination source having illumination assemblies facing each other, in an example.
Figure 2B:
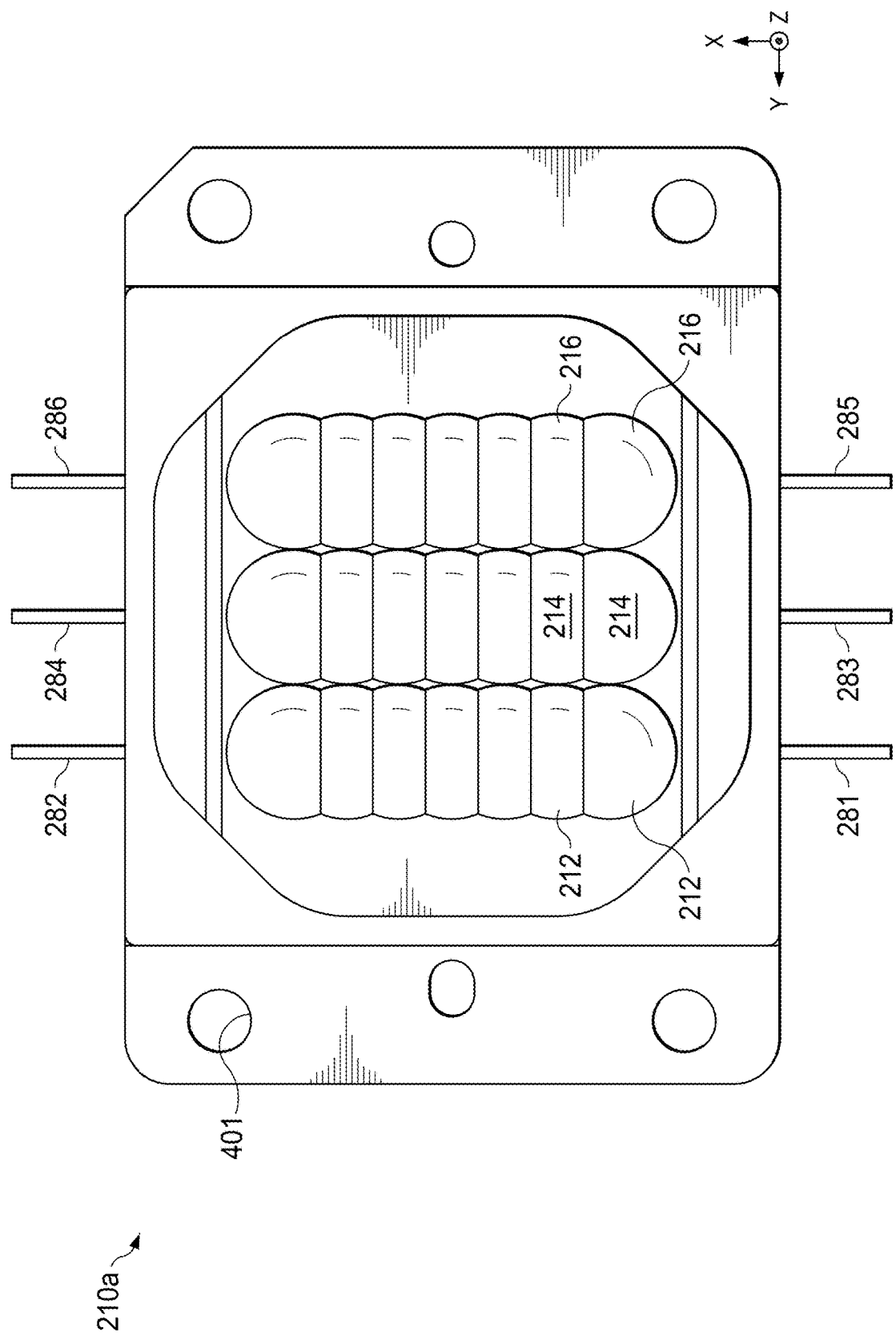
FIG. 2B is a front view of an illumination assembly, in an example.

FIG. 2A is top view of an illumination source, which may be an example of the illumination source 110 illustrated in FIG. 1. Illumination source 110 includes a housing 215 having opposing surfaces 215a and 215b, and a surface 215c coupled to surfaces 215a and 215b. In one example, surface 215c is at an angle of approximately 90 degrees with respect to surfaces 215a and 215b. Housing 215 is a support structure to which light assemblies 210a and 210b are attached. In some examples, housing 215 is constructed of any suitable material, examples of which include cast aluminum, stainless steel, titanium, copper, a nickel-iron-cobalt alloy (e.g., Kovar), and a nickel-iron alloy (e.g., Invar). Illumination source 110 includes light assemblies 210a and 210b, an example of which is shown in FIG. 2B and described below. Light assembly 210a includes illumination devices 212, 214, and 216 supported by a support structure 210a_1 and 210a_2. Light assembly 210a and its illumination devices 212, 214, and 216 are arranged along surface 215a. Light assembly 210b includes illumination devices 222, 224, and 226 supported by a support structures 210b_1 and 210b_2. Light assembly 210b and its illumination devices 222, 224, and 226 are arranged along surface 215b. In an example, illumination devices 212, 214, 216, 222, 224, and 226 are laser diodes. Laser diodes have relatively narrow light beams and, accordingly, generate relatively high light intensity across a narrow beam. The use of laser diodes allows multiple laser diodes to be included as the illumination devices while still emitting a beam that falls within the etendue of SLM 140. In another example, the illumination devices are light emitting diodes (LEDs). Each illumination device 212, 214, 216, 222, 224, and 226 includes first and second terminals, although in the top view of FIG. 2a, only one terminal for each illumination device is shown. Illumination devices 212, 214, 216, 222, 224, and 226 include respective terminals 281, 283, 285, 231, 232, and 233.

For light assembly 210a, illumination devices 212, 214, and 216 produce light 261, 262, and 263, respectively. Light 261 has a first color. Light 262 has a second color. Light 263 has a third color. The first color may be different than the second and third colors, and the second color may be different than the third color. For light assembly 210b, illumination devices 212, 214, and 216 produce light 271, 272, and 273, respectively. Light 271 has the first color. Light 272 has the second color. Light 273 has the third color. In one example, any of the first, second, and third colors may be red, green, or blue. In FIG. 2A as well as FIGS. 2C, 2D, and 7-11, examples of the colors of light produced by the illumination devices are designated by the parenthetical letter R for red, the letter G for green, and the letter B for blue. In FIG. 2A, illumination devices 212 and 222 produce red light, illumination devices 214 and 224 produce blue light, and illumination devices 216 and 226 produce green light. In other examples, the color of the light produced by the illumination devices is other than red, green, and blue.

Illumination source 110 also includes at least one optical combining element optically coupled to illumination devices 212, 214, 216, 222, 224, and 226. The optical combining elements of illumination source 110 includes a mirror 230 and a dichroic filter 234, which are attached to surface 215d of housing 215. In this example, mirror 230 and dichroic filter 234 are chevron-shaped. Accordingly, the optical combining element in this example and in other examples described herein are chevron-shaped optical combining elements. In one example, mirror 230 and dichroic filter 234 are each a contiguous structure formed in a chevron-shape. In another example, mirror 230 includes individual mirrors mounted together in housing 215 in a chevron-shape arrangement. Similarly, dichroic filter 234 may include individual dichroic filters mounted together in housing 215 in a chevron-shape arrangement. In examples in which mirror 230 and dichroic filter 234 includes individual mirrors and individual dichroic filters, the individual mirrors and individual dichroic filters may or may not be in contact with each other. For example, a gap may be present between the individual mirrors of mirror 230 and/or the individual dichroic filters of dichroic filter 234. References herein to mirrors, dichroic filters, and polarizing beam splitters being chevron-shaped includes a single mirror, dichroic filter, or polarizing beam splitter that is chevron-shaped, or as described above, individual mirrors, dichroic filters, or polarizing beam splitters that are separated by a gap but still arranged in a chevron-shape. The combination of mirror 230 and dichroic filter 234 is configured to direct the light produced by the illumination devices 212, 214, 216, 222, 224, and 226 in a direction 250 away from housing 215. In the example of FIG. 2A, direction 250 is orthogonal to surface 215c.

A dichroic filter is an optical filter that selectively reflects or transmits light of certain wavelengths while allowing light at other wavelengths to pass through. The selective property of a dichroic filter may be based on the principles of dichroism, which refers to the differential absorption or reflection of light depending on its wavelength. A dichroic filter may include thin layers of dielectric materials deposited on a glass substrate. The layers are created to selectively reflect or transmit specific wavelengths of light while reducing the absorption and at other wavelengths.

Mirror 230 reflects red light 261 and 271 along direction 250. Dichroic filter 234 is configured to be transmissive to red light and reflective to blue and green light. Accordingly, blue light 262 and 272 and green light 263 and 273 reflect off dichroic filter 234 along direction 250.

Illumination source 110 has dimensions D1 and D2. Because light assemblies 210a and 210b face each other and the optical combining elements (mirror 230 and dichroic filter 234) redirect the light along direction 250, the dimensions D1 and D2 are relatively small while illumination source 110 produces a relatively high light intensity. In one example, D1 and D2 are approximately 45 millimeters. In one example, the optical power of light from illumination source 110 is approximately 184 W within a beam area of approximately 4.25 cm$^2$ which is a flux density of approximately 43 W/cm$^2$.

FIG. 2B is a side view of light assembly 210a. Light assembly 210b can be constructed similarly. Light assembly 210a includes multiple illumination devices 212 arranged in a first column, multiple illumination devices 214 arranged in a second column, and multiple illumination devices 216 arranged in a third column. The illumination devices in each column include light emitting devices (e.g., laser diodes, LEDs, etc.) electrically coupled in series between two terminals. Terminals 281 and 282 are coupled to the column of illumination devices 212. Terminals 283 and 284 are coupled to the column of illumination devices 214. Terminals 285 and 286 are coupled to the column of illumination devices 216. Each illumination device also includes a lens covering the light emitting device. The three columns of illumination devices are adjacent to one another as shown in FIG. 2B. In other examples, a light assembly includes two or more columns of illumination devices of the same color, e.g., two columns of red illumination devices, one column of green illumination devices, and one column of blue illumination devices. Mounting holes 401 are included to allow the light assembly to mounted to housing 215 and further discussed below.

Figure 2C:
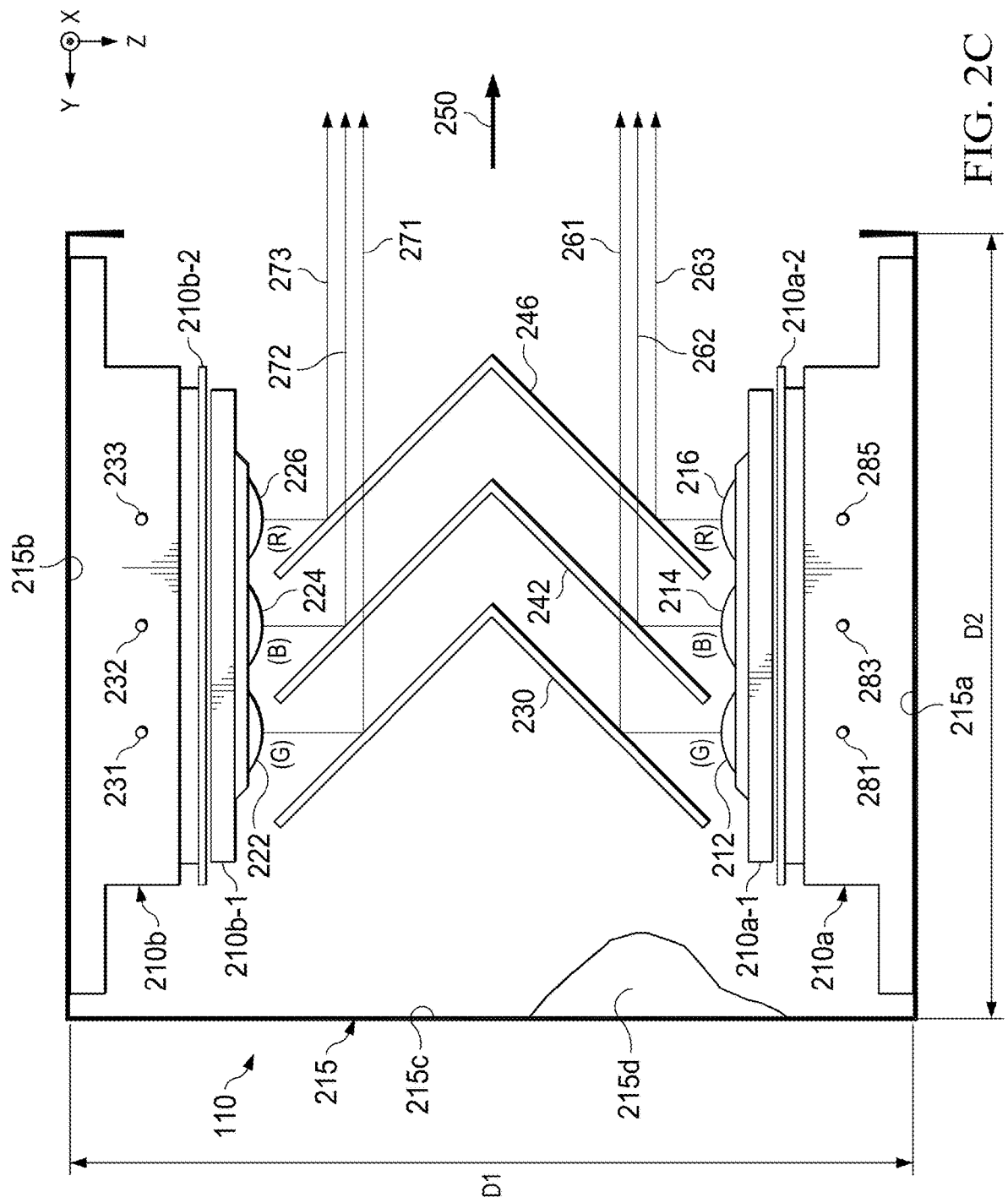
FIG. 2C is a top view of an illumination source in another example.

FIG. 2C is a top view of illumination source 110 in another example. In this example, illumination devices 212 and 222 produce respective green light 261 and 271, illumination devices 214 and 224 produce respective blue light 262 and 272, and illumination devices 216 and 226 produce respective red light 263 and 273. The optical combining elements include mirror 230 and dichroic filters 242 and 246. In this example, mirror 230 and dichroic filters 242 and 246 are chevron-shaped as described above. Dichroic filter 242 is transmissive to green light and reflects blue light. Dichroic filter 246 is transmissive to green and blue light and reflects red light. Accordingly, green light 261 and 271 reflects off mirror 230 and then passes through dichroic filters 242 and 246. Blue light 262 and 272 reflects off dichroic filter 242 and passes through dichroic filter 246. Red light 263 and 273 reflects off dichroic filter 246.

Figure 2D:
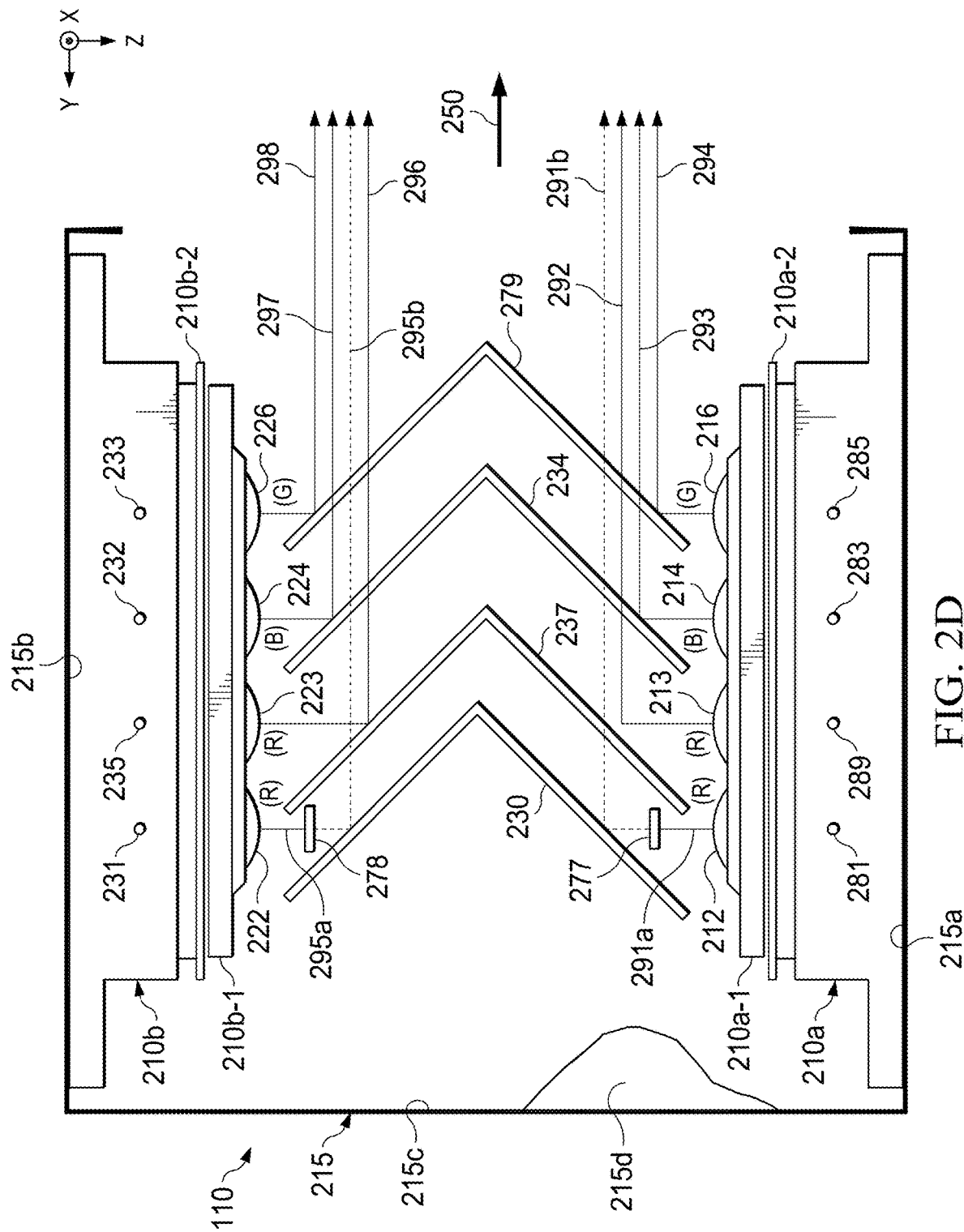
FIG. 2D is a top view of an illumination source in yet another example.

FIG. 2D is a top view of illumination source 110 in another example. In this example, light assemblies 210a and 210b include four columns of illumination devices. Light assembly 210a includes illumination devices 212 and 213 producing light 291a and 292, respectively, having the same color (red), illumination device 214 producing blue light 293, and illumination device 216 producing green light 294. The column of illumination devices 213 is coupled to a pair of terminals including terminal 289. Similarly, light assembly 210b includes illumination devices 222 and 223 producing light 295a and 296, respectively, having the same color (red), illumination device 224 producing blue light 297, and illumination device 226 producing green light 298. The column of illumination devices 223 is coupled to a pair of terminals including terminal 235.

In FIGS. 2D and 7-11, some of the light is represented by solid lines and other light is represented by dashed lines. Light represented by a solid line refers to one type of polarization, e.g., S polarization, and light represented by a dashed line refers to another type of polarization, e.g., P polarization. Light having an S polarization (also referred to as transverse electric (TE)) has an electric field that is perpendicular to the plane of incidence and light having P polarization (also referred to as transverse magnetic (TM)) has a magnetic field that is perpendicular to the plane of incidence. For example, in FIG. 2D, light 291a, 292-294, 295a, and 296-298 produced by the respective illumination devices 212, 213, 214, 216, 222, 223, 224, and 226 has the same polarization, e.g., S polarization but can have P polarization in other examples.

In FIG. 2D, the optical combining elements include mirror 230, a polarizing beam splitter 237, dichroic filters 234 and 279, and half waveplates 277 and 278. Mirror 230, polarizing beam splitter 237, and dichroic filters 234 and 279 are chevron-shaped in this example, as described above. A polarizing beam splitter is transmissive to light of one polarization and reflects light of another polarization. Polarizing beam splitters may include birefringent materials which refract polarizations differently, thin film polarizers including an optical stack incorporating Brewster's angle or interference effects to affect the polarized light, or wire-grid polarizers which use fine nanometer wires that affect the medium containing the polarized light. Such polarizing beam splitters may include a glass plate or be embedded at 45 degree interface angle within in a cube. In the example of FIG. 2D, polarizing beam splitter 237 is transmissive to light having P polarization and reflects light having S polarization. A half waveplate rotates the polarization of light by 90 degrees. Half waveplates 277 and 278 convert respective red light 291a and 295a having S polarization to red light 291b and 295b having P polarization. Dichroic filter 234 is transmissive to red light and reflects blue light. Dichroic filter 279 is transmissive to red and blue light and reflects green light. Accordingly, red light 291b, 292, 295b, and 296 pass through dichroic filters 234 and 279, blue light 293 and 297 reflects off dichroic filter 234 and passes through dichroic filter 279, and green light 294 and 298 reflects off dichroic filter 279. In another example, illumination devices 212 and 222 produce light having P polarization in which case half waveplates 277 and 278 may not be included.

Figure 3:
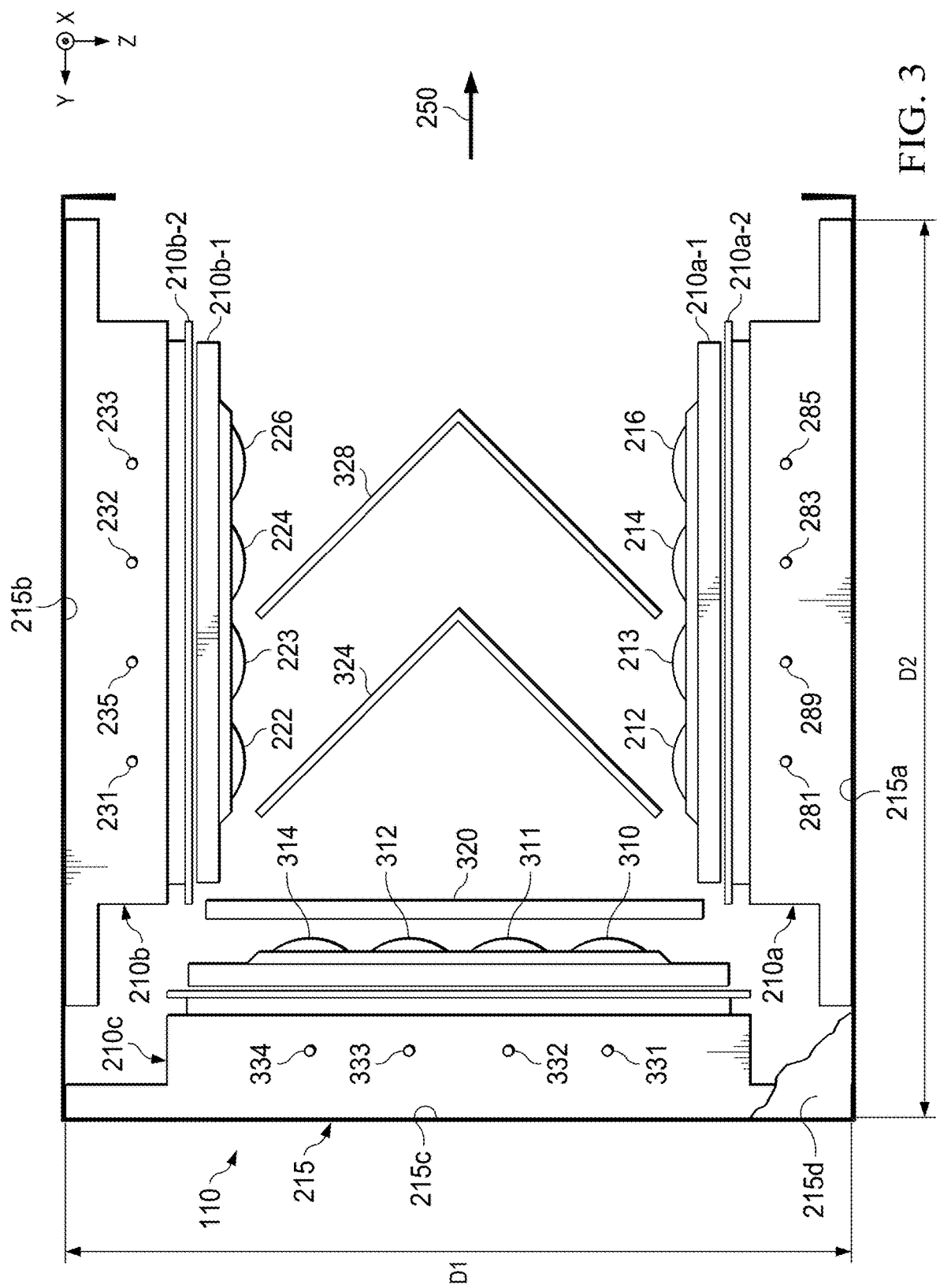
FIG. 3 is a top view of an illumination source having three illumination assemblies, in an example.
Figure 4:
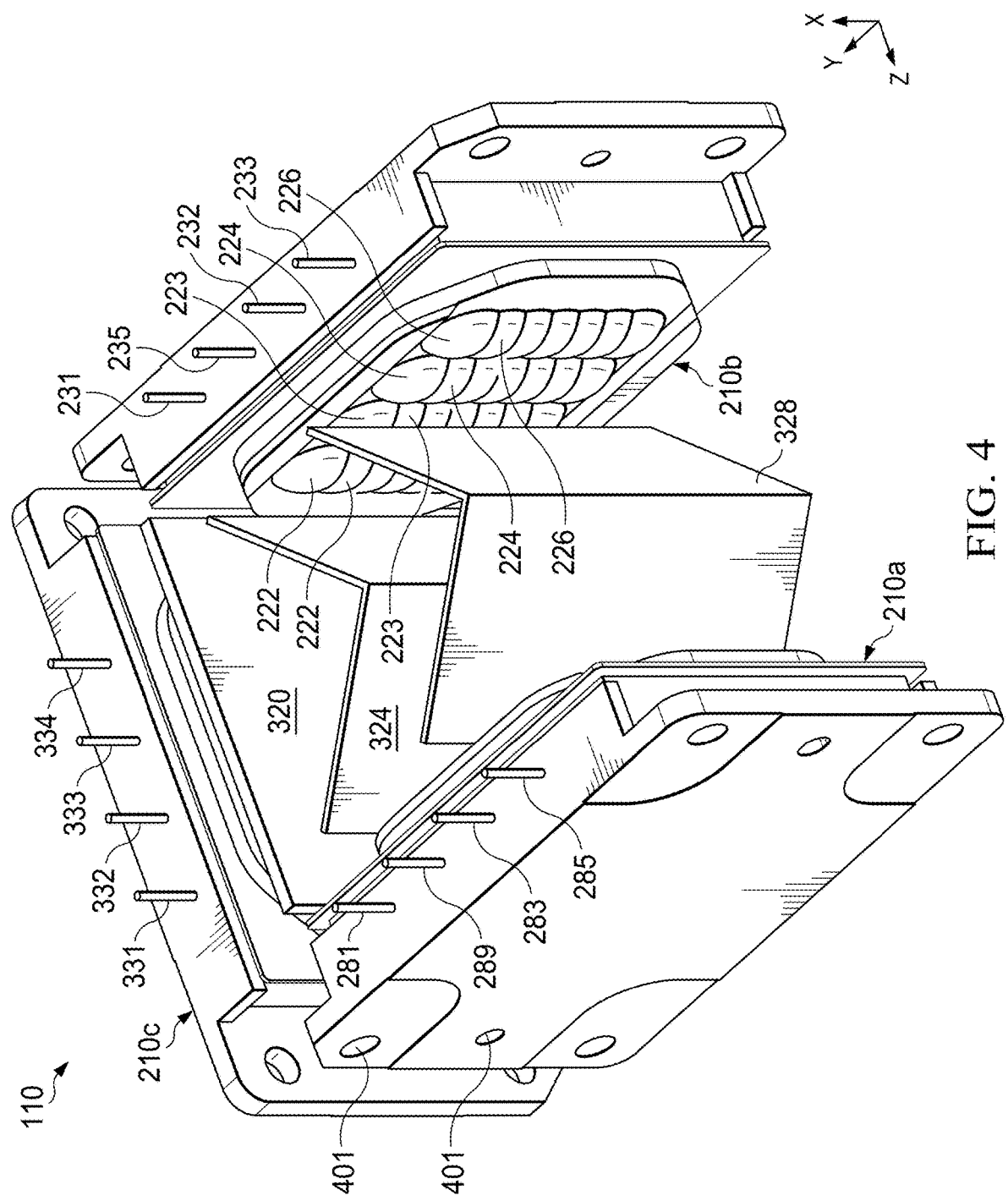
FIGS. 4, 5, and 6 are perspective views of the illumination source of FIG. 3.
Figure 5:
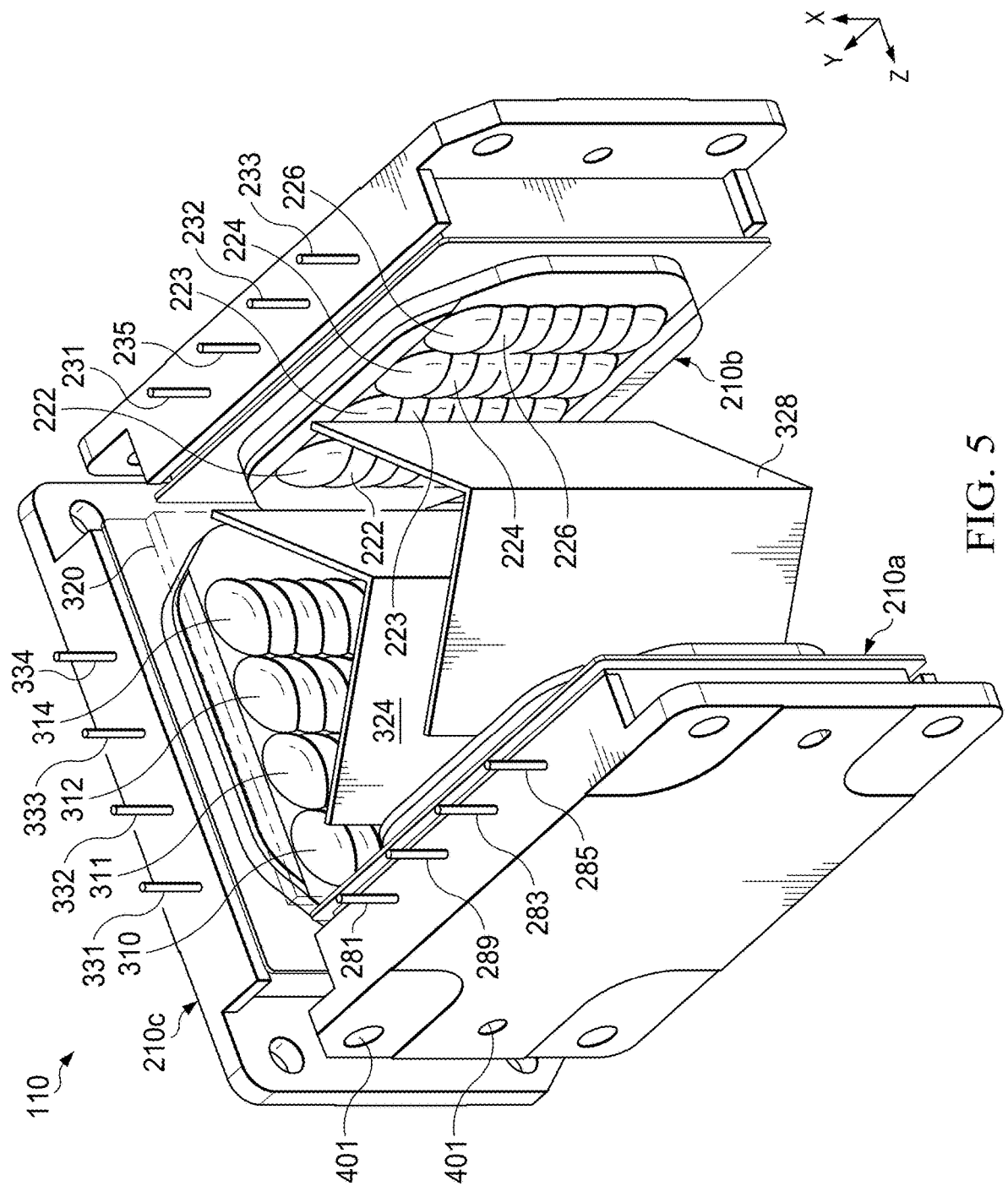
Figure 6:
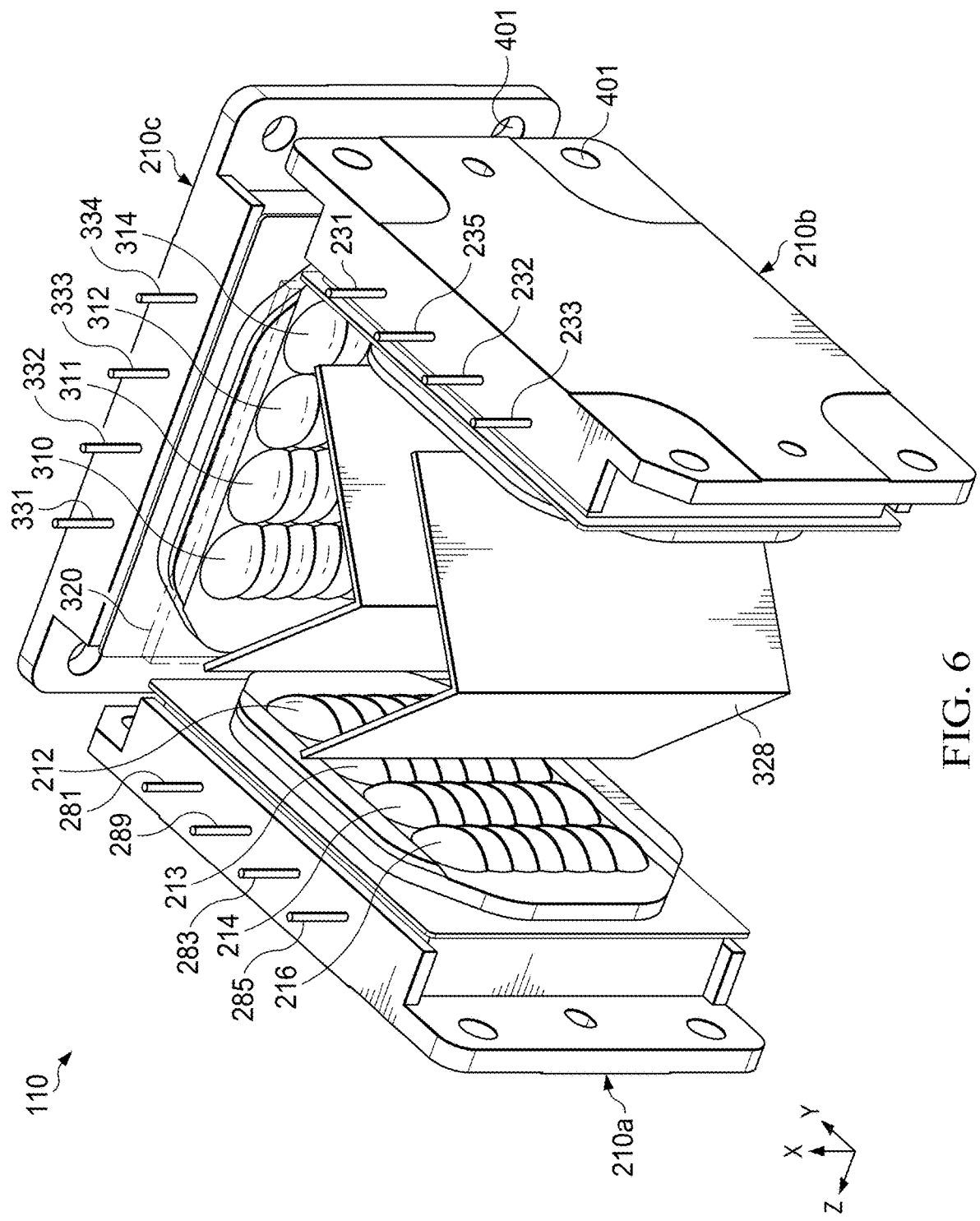

FIG. 3 is a top view of illumination source 110 including light assemblies 210a and 210b arranged along respective opposing surfaces 215a and 215b of housing 215 and including a light assembly 210c. FIGS. 4-6 are perspective views of illumination source 110 depicted in FIG. 3. Light assembly 210c includes illumination devices 310, 311, 312, and 314. Each illumination device 310, 311, 312, and 314 may be a single illumination device or multiple illumination devices in a column, as illustrated in the example of FIG. 2B. Light assembly 210c and its illumination devices 310, 311, 312, and 314 are arranged along surface 215c. Two illumination devices of illumination devices 310, 311, 312, and 314 may produce light having the same color (e.g., red), and the other two illumination devices produce light different from each other and different from the two illumination devices producing light of the same color. For example, illumination devices 310 and 311 may produce red light, illumination device 312 may produce blue light, and illumination device 314 may produce green light. Terminals 331, 332, 333, and 334 are coupled to the respective illumination devices 310, 311, 312, and 314. In the example of FIG. 3 as well as in the examples of FIGS. 4-11 described below, each light assembly 210a-210c has four illumination devices but in other examples, one or more of light assemblies 210a-210c has three illumination devices such as in the examples of FIGS. 2A-2C.

The optical combining elements of illumination source 110 in the example of FIG. 3 include a half waveplate 320, a polarizing beam splitter 324, and a dichroic filter 328. As described below, half waveplate 320 rotates the angle of the polarization of light produced by illumination devices 310, 311, 312, and 314. Light from illumination devices 310, 311, 312, and 314 passes through polarizing beam splitter 324 and dichroic filter 328 along direction 250. Light produced by illumination devices 212, 213, 222, and 223 reflects off polarizing beam splitter 324 and then passes through dichroic filter 328 along direction 250. Light produced by illumination devices 214, 216, 224, and 226 reflects off dichroic filter 328 along direction 250.

The combination of three light assemblies 210a, 210b, and 210c and the optical combining elements (half waveplate 320, polarizing beam splitter 324, and dichroic filter 328) results in a compact illumination source producing relatively high intensity light. In one example, dimensions D1 and D2 of the illumination source 110 in FIG. 3 may be as described above with regard to FIG. 2A. The optical power of the light from illumination source 110 in FIG. 3 may be approximately 276 W within a beam area of 4.25 cm$^2$.

FIGS. 4, 5, and 6 are perspective views of illumination source 110 depicted in FIG. 3. Housing 215 has been omitted in these views for clarity. The illumination devices 310, 311, 312, and 314 of light assembly 210c are hidden behind half waveplate 320 in FIG. 4 but are visible in FIG. 5 in which half waveplate 320 is shown in phantom outline. FIGS. 4, 5, and 6 also illustrate that the example light assemblies 210a, 210b, and 210c include mounting holes 401 for mounting the light assemblies to housing 215, e.g., by screws, rivets, bolts, etc.

Figure 7:
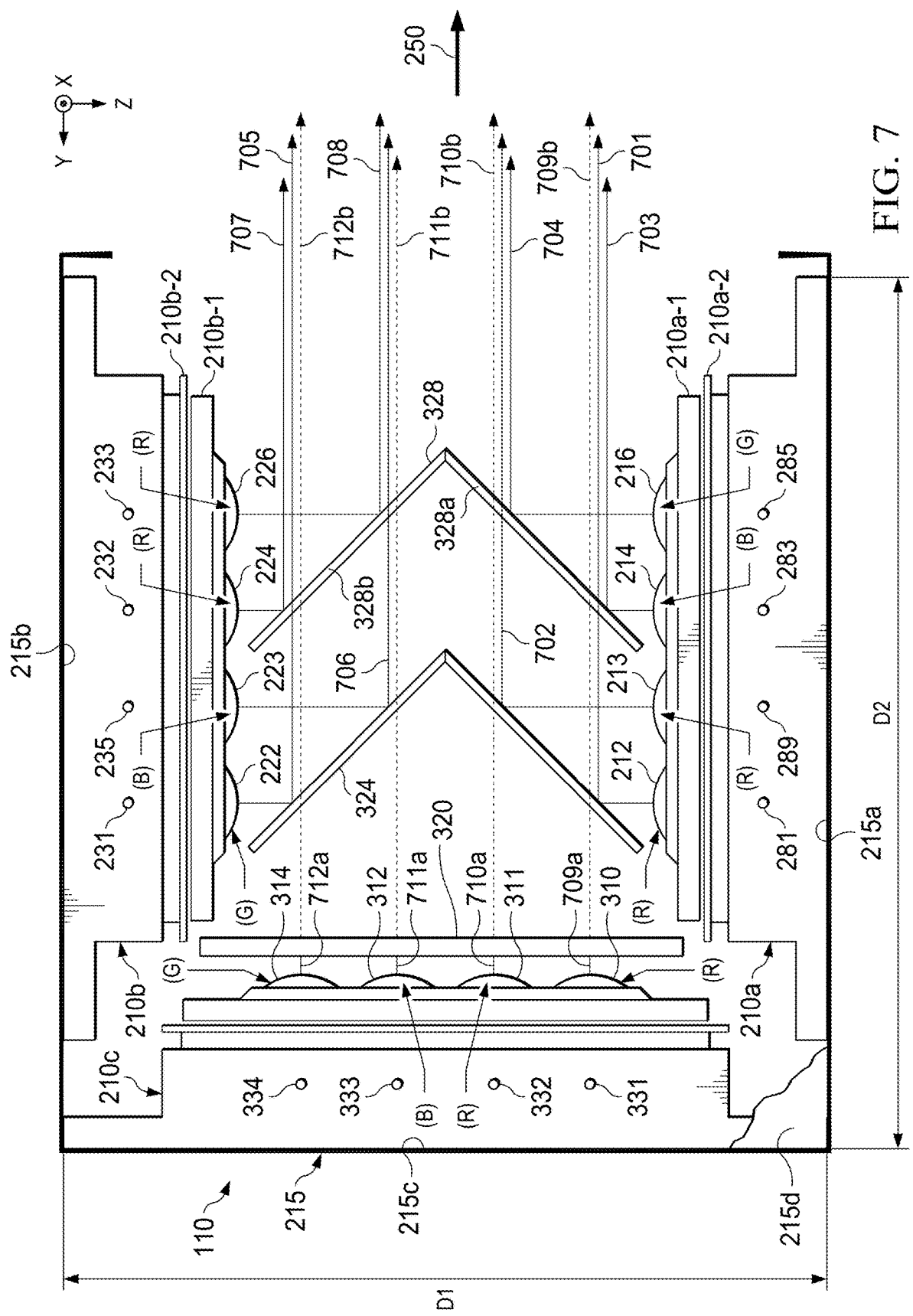
FIGS. 7, 8, 9, 10, and 11 are top views of the illumination source of FIG. 3 in different example configurations.

FIGS. 7-11 illustrate different configurations of illumination source 110 of FIG. 3. As described above, the solid light lines represent a different polarization (e.g., S polarization) than the dashed light lines (e.g., P polarization). In FIG. 7, illumination devices 212, 213, 214, 216, 222, 223, 224, 226, 310, 311, 312, and 314 produce light having the same polarization, e.g., S polarization. Illumination devices 212, 213, 214, and 216 produce respective light 701, 702, 703, and 704. Similarly, illumination devices 222, 223, 224, and 214 produce respective light 705, 706, 707, and 708. Illumination devices 310, 311, 312, and 314 produce respective light 709a, 710a, 711a, and 712a. The color of light 704, 705, and 712a is green. The color of light 703, 706, and 711a is blue. The color of light 701, 702, 707, 708, 709a, and 710a is red.

The optical combining elements include half waveplate 320, polarizing beam splitter 324, and dichroic filter 328. Polarizing beam splitter 324 is chevron-shaped in this example. Dichroic filter 328 includes a longpass dichroic filter 328a and a shortpass dichroic filter 328b. Longpass dichroic filter 328a allows light at longer wavelengths, e.g., red, to pass through while reflecting light at shorter wavelengths, e.g., blue and green. Shortpass dichroic filter 328b allows light at shorter wavelengths, e.g., blue and green, to pass through while reflecting light at longer wavelengths, e.g., red.

Half waveplate 320 converts light 709a, 710a, 711a, and 712a having S polarization to light 709b, 710b, 711b, and 712b having P polarization. In this example, polarizing beam splitter 324 reflects light having S polarization and is transmissive to light having P polarization. Polarizing beam splitter 324 allows light 709b, 710b, 711b, and 712b having P polarization to pass through while reflecting light 701, 702, 705, and 706 having S polarization along direction 250. Longpass dichroic filter 328a allows red light 701, 702, 709b, and 710b to pass through along direction 250 while reflecting blue light 703 and green light 704. Shortpass dichroic filter 328b allows green light 705 and 712b and blue light 706 and 711b to pass through along direction 250 while reflecting red light 707 and 708.

Figure 8:
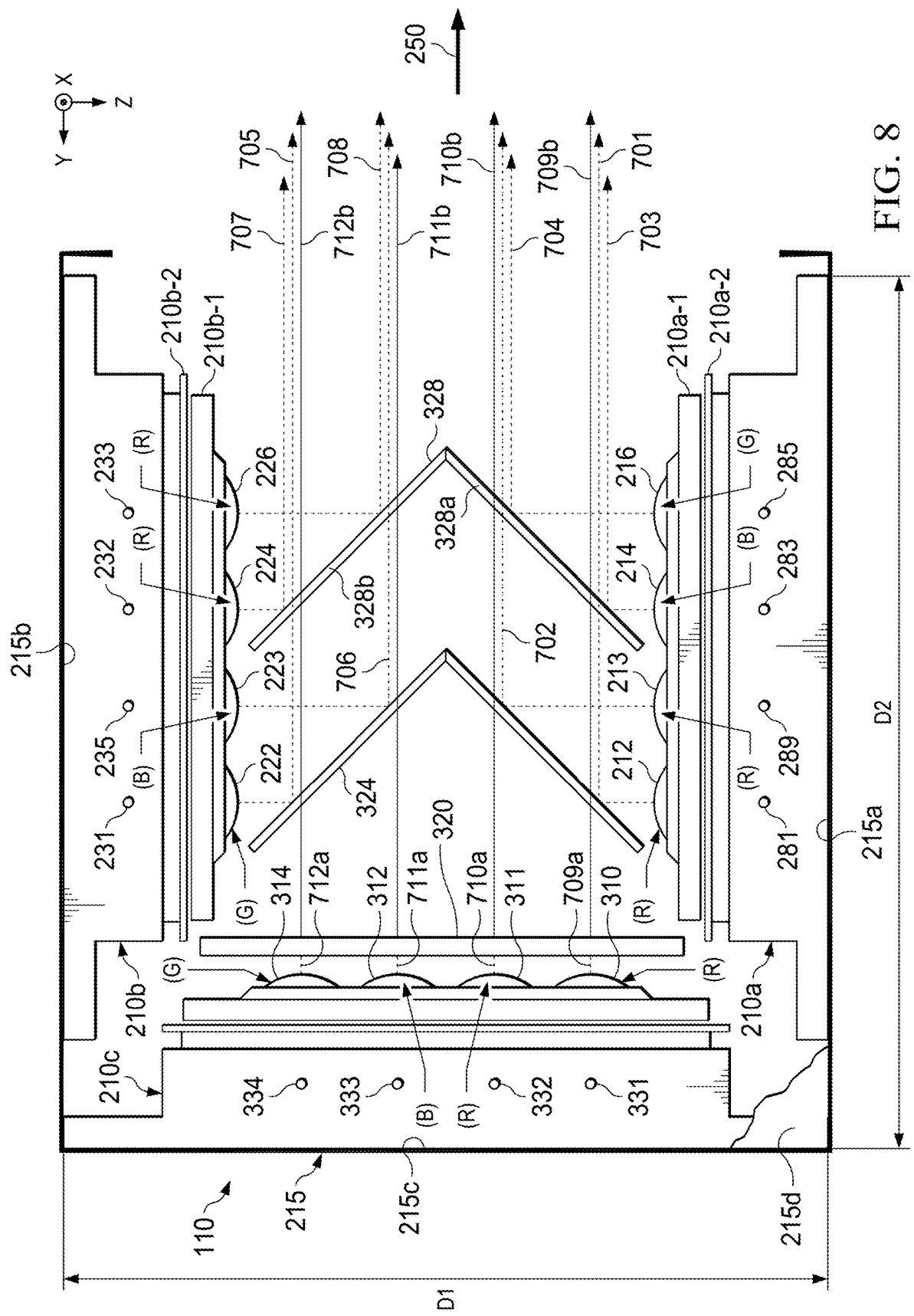

FIG. 8 is a top view of illumination source 110 similar to that of FIG. 7. A difference between the illumination sources 110 in FIGS. 7 and 8 is that illumination devices 212, 213, 214, 216, 222, 223, 224, 226, 310, 311, 312, and 314 in FIG. 8 produce light having P polarization while the same illumination devices in FIG. 7 produce light having S polarization. In the example of FIG. 8, polarizing beam splitter 324 is configured to reflect P polarized light while being transmissive to S polarized light. As described above with respect to FIG. 7, dichroic filter 328 includes longpass dichroic filter 328a and shortpass dichroic filter 328b. Half waveplate 320 converts light 709a, 710a, 711a, and 712a having P polarization to light 709b, 710b, 711b, and 712b having S polarization. Polarizing beam splitter 324 allows light 709b, 710b, 711b, and 712b having S polarization to pass through while reflecting light 701, 702, 705, and 706 having P polarization along direction 250. Longpass dichroic filter 328a allows red light 701, 702, 709b, and 710b to pass through along direction 250 while reflecting blue light 703 and green light 704. Shortpass dichroic filter 328b allows green light 705 and 712b and blue light 706 and 711b to pass through along direction 250 while reflecting red light 707 and 708.

Figure 9:
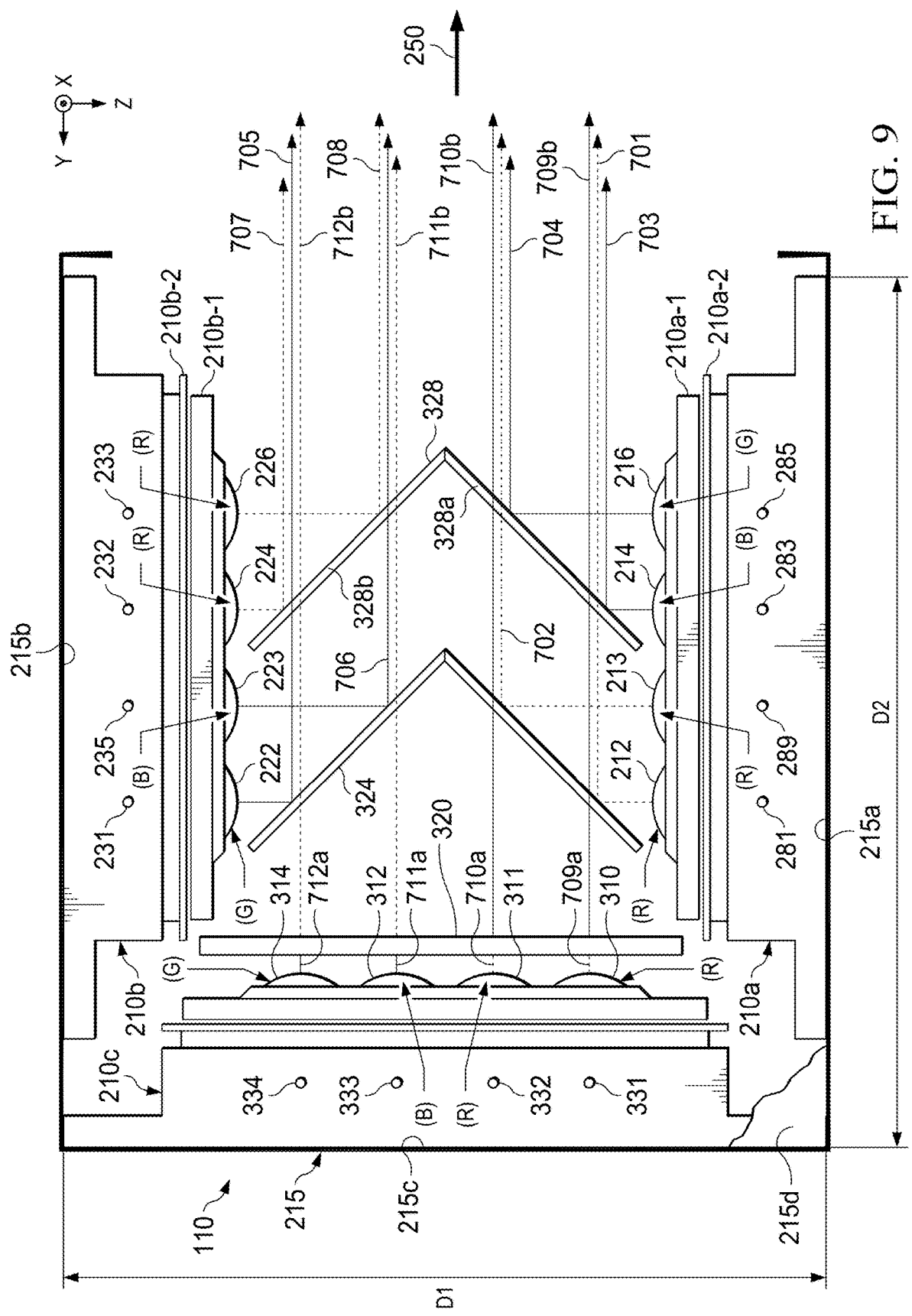

FIG. 9 is a top view of illumination source 110 in another example. In FIG. 9, illumination devices 212, 213, 224, 226, 310, and 311 produce light having the same polarization, e.g., P polarization, while illumination devices 214, 216, 222, 223, 312, and 314 produce light having a different polarization, e.g., S polarization. The color of light 704, 705, and 712a from respective illumination devices 216, 222, and 314 is green. The color of light 703, 706, and 711a from respective illumination devices 214, 223, and 312 is blue. The color of light 701, 702, 707, 708, 709a, and 710a from respective illumination devices 212, 213, 224, 226, 310, and 311 is red. The optical combining elements include half waveplate 320, polarizing beam splitter 324, and dichroic filter 328. In this example, polarizing beam splitter 324 includes polarizing beam splitters 324a and 324b, which are placed or coupled together in a chevron-shape. Polarizing beam splitter 324a is configured to reflect light having P polarization while being transmissive to light having S polarization. Polarizing beam splitter 324b is configured to reflect light having S polarization while being transmissive to light having P polarization. Dichroic filter 328 includes longpass dichroic filter 328a and shortpass dichroic filter 328b.

Half waveplate 320 converts light 709a and 710a having P polarization to corresponding light 709b and 710b having S polarization. Similarly, half waveplate 320 converts light 711a and 712a having S polarization to corresponding light 711b and 712b having P polarization. Polarizing beam splitter 324a allows light 709b and 710b having S polarization to pass through along direction 250 while reflecting light 701 and 702 having P polarization. Polarizing beam splitter 324b allows light 711b and 712b having P polarization to pass through while reflecting light 705 and 706 having S polarization. Longpass dichroic filter 328a allows red light 701, 702, 709b, and 710b to pass through along direction 250 while reflecting blue light 703 and green light 704. Shortpass dichroic filter 328b allows green light 705 and 712b and blue light 706 and 711b to pass through along direction 250 while reflecting red light 707 and 708.

Figure 10:
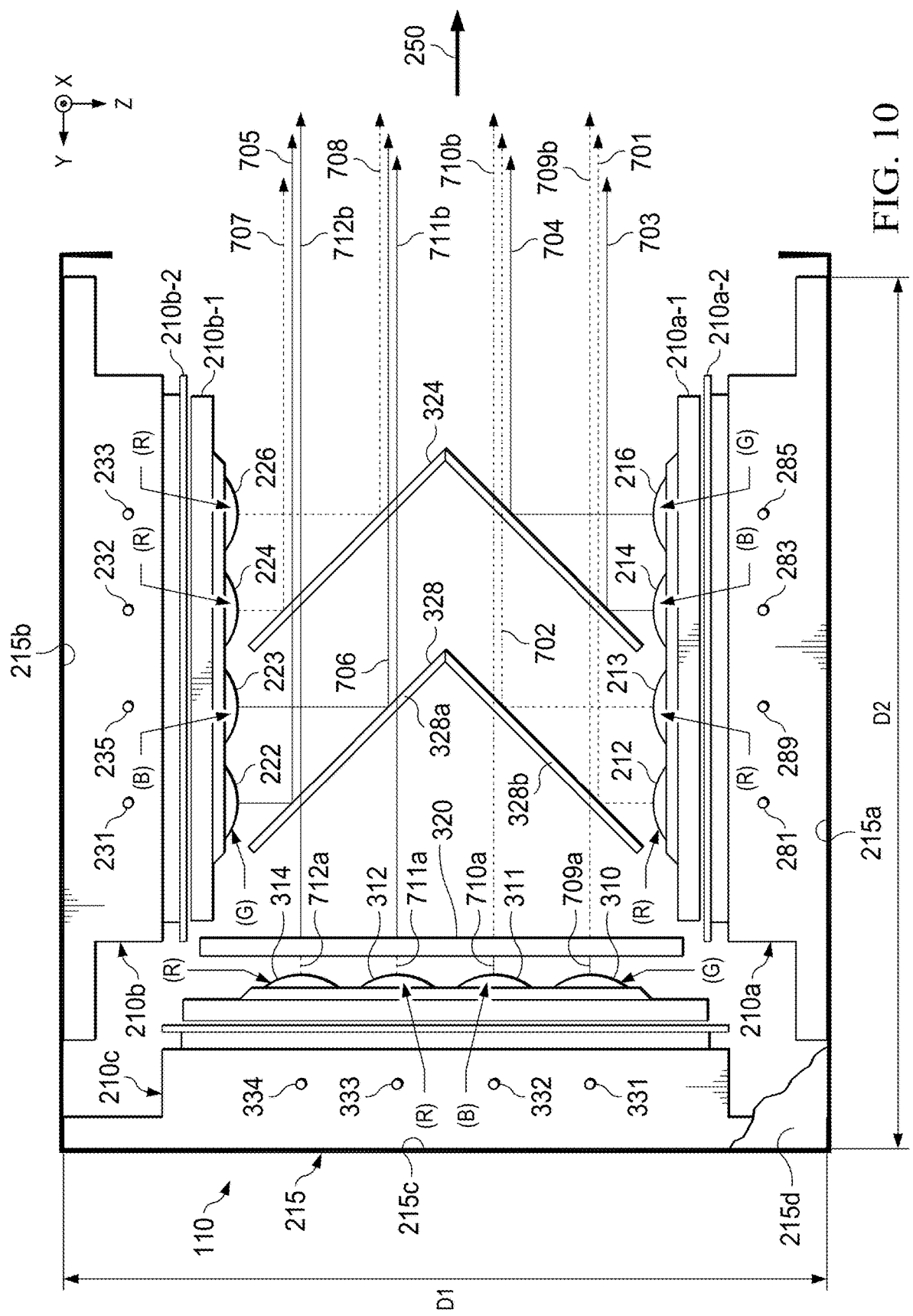

FIG. 10 is a top view of illumination source 110 in another example. In FIG. 10, illumination devices 212, 213, 224, 226, 312, and 314 produce light having the same polarization, e.g., P polarization, while illumination devices 214, 216, 222, 223, 310, and 311 produce light having a different polarization, e.g., S polarization. The color of light 704, 705, and 709a from respective illumination devices 216, 222, and 310 is green. The color of light 703, 706, and 710a from respective illumination devices 214, 223, and 311 is blue. The color of light 701, 702, 707, 708, 711a, and 712a from respective illumination devices 212, 213, 224, 226, 312, and 314 is red. The optical combining elements include half waveplate 320, polarizing beam splitter 324, and dichroic filter 328. In this example, dichroic filter 328 is between half waveplate 320 and polarizing beam splitter 324. Dichroic filter 328 includes longpass dichroic filter 328a and shortpass dichroic filter 328b. Polarizing beam splitter 324 includes polarizing beam splitters 324a and 324b. Polarizing beam splitter 324a is configured to reflect light having P polarization while being transmissive to light having S polarization. Polarizing beam splitter 324b is configured to reflect light having S polarization while being transmissive to light having P polarization.

Half waveplate 320 converts light 709a and 710a having S polarization to corresponding light 709b and 710b having P polarization. Similarly, half waveplate 320 converts light 711a and 712a having P polarization to corresponding light 711b and 712b having S polarization. Shortpass dichroic filter 328b allows green light 709b and blue light 710b to pass through while reflecting red light 701 and 702. Longpass dichroic filter 328a allows red light 711b and 712b to pass through while reflecting green light 705 and blue light

706. Polarizing beam splitter 324*b* allows light 701, 702, 709*b*, and 710*b* having P polarization to pass through along direction 250 while reflecting light 703 and 704 having S polarization. Polarizing beam splitter 324*a* allows light 705, 706, 711*b*, and 712*b* having S polarization to pass through along direction 250 while reflecting light 707 and 708 having P polarization.

Figure 11:
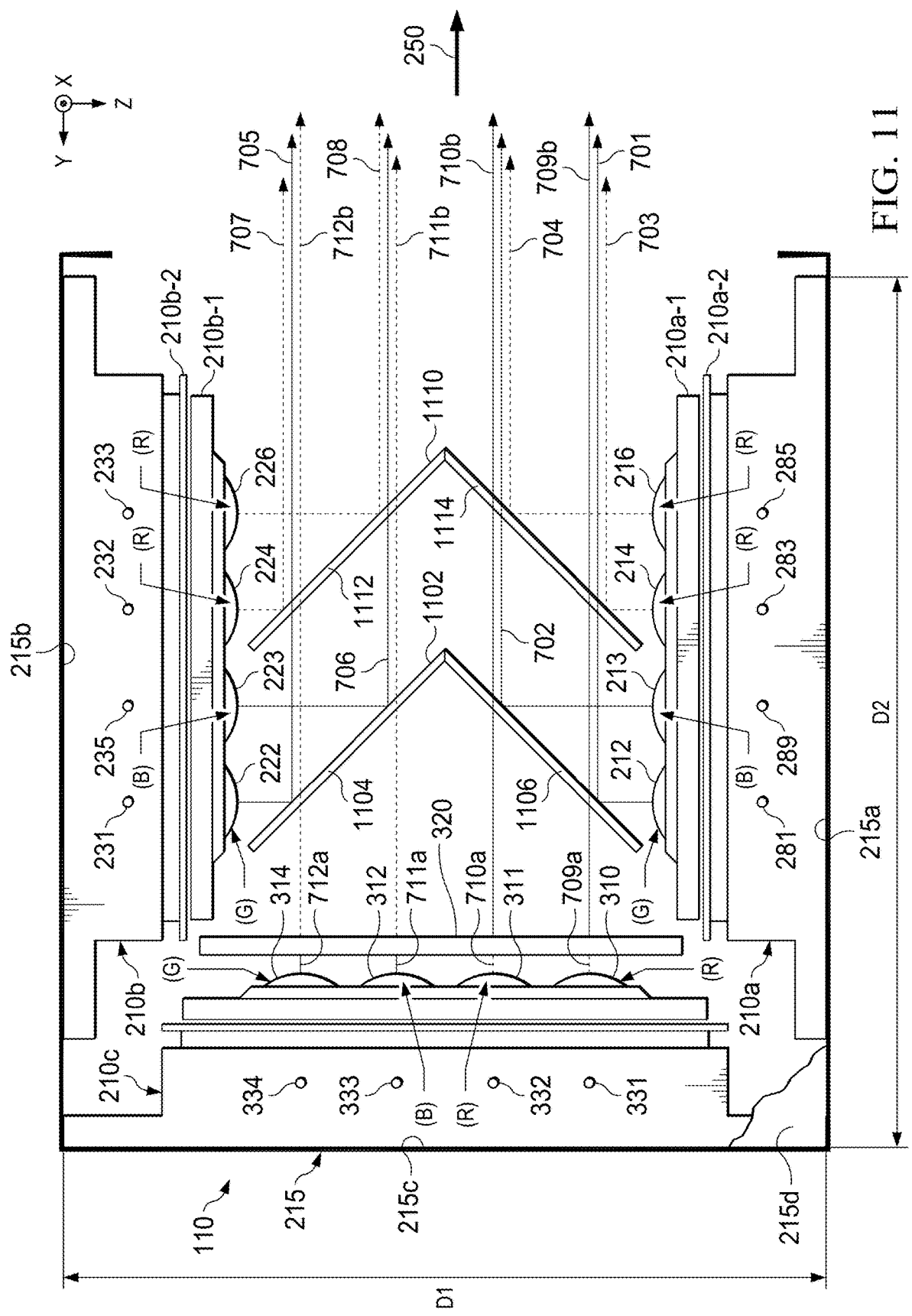

FIG. 11 is a top view of illumination source 110 in another example. In FIG. 11, illumination devices 212, 213, 222, 223, 312, and 314 produce light having the same polarization, e.g., S polarization, while illumination devices 214, 216, 224, 226, 310, and 311 produce light having a different polarization, e.g., P polarization. The color of light 701, 705, and 712*a* produced by respective illumination devices 212, 222, and 314 is green. The color of light 702, 706, and 711*a* produced by respective illumination devices 213, 223, and 312 is blue. The color of light 703, 704, 707, 708, 709*a*, and 710*a* produced by respective illumination devices 214, 216, 224, 226, 310, and 311 is red. The optical combining elements include half waveplate 320 and elements 1102 and 1110. Element 1102 includes a polarizing beam splitter 1104 and a longpass dichroic filter 1106 configured in a chevron-shape. Polarizing beam splitter 1104 is configured to be transmissive to P polarized light while reflecting S polarized light. Element 1110 includes a shortpass dichroic filter 1112 and a polarizing beam splitter 1114 configured in a chevron-shape. Polarizing beam splitter 1114 is configured to be transmissive to S polarized light while reflecting P polarized light.

Half waveplate 320 converts light 709*a* and 710*a* having P polarization to corresponding light 709*b* and 710*b* having S polarization. Similarly, half waveplate 320 converts light 711*a* and 712*a* having S polarization to corresponding light 711*b* and 712*b* having P polarization. Longpass dichroic filter 1106 allows red light 709*b* and 710*b* to pass through along direction 250 while reflecting green light 701 and blue light 702. Polarizing beam splitter 1104 allows blue light 711*b* and green light 712*b* having P polarization to pass through along direction 250 while reflecting green light 705 and blue light 706 having S polarization. Polarizing beam splitter 1114 allows light 701, 702, 709*b* and 710*b* having S polarization to pass through while reflecting light 703 and 704 having P polarization. Shortpass dichroic filter 1112 allows green light 705 and 712*b* and blue light 706 and 711*b* to pass through while reflecting light red light 707 and 708.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. An apparatus, comprising:
    a housing having a first surface, a second surface opposite the first surface, and a third surface coupled to the first and second surfaces;
    a first illumination device configured to produce first light, a second illumination device configured to produce second light, and a third illumination device configured to produce third light, the first, second, and third illumination devices arranged along the first surface, the first light having a first color, the second light having a second color, and the third light having a third color, the first color different than the second color and the third color, and the second color different than the third color;
    a fourth illumination device configured to produce fourth light, a fifth illumination device configured to produce fifth light, and a sixth illumination device configured to produce sixth light, the fourth, fifth, and sixth illumination devices arranged along the second surface, the fourth light having the first color, the fifth light having the second color, and the sixth light having the third color; and
    a light assembly arranged along the third surface, the light assembly configured to produce lights having the first, second, and third colors, respectively.

2. The apparatus of claim 1, further comprising at least one optical combining element optically coupled to the first illumination device, to the second illumination device, to the third illumination device, to the fourth illumination device, to the fifth illumination device, and the sixth illumination device, the at least one optical combining element configured to direct the first light, the second light, the third light, the fourth light, the fifth light, and the sixth light in a direction away from the housing.

3. The apparatus of claim 2, wherein the at least one optical combining element comprises a first chevron-shaped optical combining element and a second chevron-shaped optical combining element.

4. The apparatus of claim 2, wherein the at least one optical combining element comprises:
    a first mirror configured to reflect the first light from the first illumination device;
    a first dichroic filter configured to reflect the second light and the third light from the second and third illumination devices, respectively, and to transmit the first light reflected by the first mirror;
    a second mirror configured to reflect the fourth light from the fourth illumination device; and
    a second dichroic filter configured to reflect the fifth light and the sixth light from the fifth and sixth illumination devices, respectively, and to transmit the fourth light reflected by the second mirror.

5. The apparatus of claim 2 wherein the at least one optical combining element comprises:
a first mirror configured to reflect the first light from the first illumination device;
a first dichroic filter configured to reflect the second light from the second illumination device and to transmit the first light reflected by the first mirror;
a second dichroic filter configured to reflect the third light from the third illumination device and to transmit the first light reflected by the first mirror and the second light reflected by the first dichroic filter;
a second mirror configured to reflect the fourth light from the fourth illumination device; and
a third dichroic filter configured to reflect the fifth light from the fifth illumination device and to transmit the fourth light reflected by the second mirror; and
a fourth dichroic filter configured to reflect the sixth light from the sixth illumination device and to transmit the fourth light reflected by the second mirror and the fifth light reflected by the third dichroic filter.

6. The apparatus of claim 2, further comprising a seventh illumination device configured to produce seventh light having a same color as the first light, the seventh illumination device arranged along the first surface, wherein the at least one optical combining element comprises:
a half waveplate optically coupled to the seventh illumination device;
a mirror configured to reflect the seventh light from the half waveplate;
a polarizing beam splitter configured to reflect the first light from the first illumination device and to transmit the seventh light from the mirror;
a first dichroic filter configured to reflect the second light from the second illumination device and to transmit the first light reflected by the polarizing beam splitter and the seventh light transmitted by the polarizing beam splitter; and
a second dichroic filter configured to reflect the third light from the third illumination device and to transmit the second light reflected by the first dichroic filter and the first light and the seventh light transmitted by the first dichroic filter.

7. The apparatus of claim 2, wherein the light assembly comprises:
a seventh illumination device, an eighth illumination device, and a ninth illumination device, each arranged along the third surface, in which the seventh illumination device is configured to produce seventh light having the first color, the eighth illumination device is configured to produce eighth light having the second color, and the ninth illumination device is configured to produce ninth light having the third color; and
a half waveplate optically coupled to the seventh illumination device, the eighth illumination device, and the ninth illumination device.

8. The apparatus of claim 7, wherein the first through ninth light have a same polarization.

9. The apparatus of claim 7, wherein:
wherein the first light has a first polarization and the second light has a second polarization, the second polarization different than the first polarization;
wherein the fourth light has the first polarization and the fifth light has the second polarization; and
wherein the seventh light has the first polarization and the eighth light has the second polarization.

10. The apparatus of claim 7, wherein the at least one optical combining element comprises:
a first polarizing beam splitter configured to reflect the first light and the second light and to be transmissive to the seventh light and the eighth light from the half waveplate; and
a first dichroic filter configured to reflect the third light and to be transmissive to the first light, the second light, the seventh light, and the eighth light from the first polarizing beam splitter.

11. The apparatus of claim 7, wherein the at least one optical combining element comprises:
a first dichroic filter configured to reflect the first light and the second light and to be transmissive to the seventh light from the half waveplate;
a first polarizing beam splitter configured to reflect the third light and to be transmissive to the first light, second, and seventh light from the first dichroic filter;
a second dichroic filter configured to reflect the sixth light and to be transmissive to the eighth light and ninth light; and
a second polarizing beam splitter configured to reflect the fourth light and the fifth light and to be transmissive to the sixth light, eighth light, and ninth light from the second dichroic filter.

12. An apparatus, comprising:
a first illumination assembly having a first illumination device configured to produce first light, a second illumination device configured to produce second light, and a third illumination device configured to produce third light, the first light having a first color, the second light having a second color, and the third light having a third color, the first color different than the second color and the third color, and the second color different than the third color;
a second illumination assembly having a fourth illumination device configured to produce fourth light, a fifth illumination device configured to produce fifth light, and a sixth illumination device configured to produce sixth light, the fourth light having the first color, the fifth light having the second color, and the sixth light having the third color, the second illumination assembly facing the first illumination assembly;
a third illumination assembly having a seventh illumination device configured to produce seventh light, an eighth illumination device configured to produce eighth light, and a ninth illumination device configured to produce ninth light, the seventh light having the first color, the eighth light having the second color, and the ninth light having the third color, the third illumination assembly adjacent the first and second illumination assemblies; and
a half waveplate configured to be optically coupled to one of the first, second, and third illumination assemblies.

13. The apparatus of claim 12, wherein the half waveplate is configured to be optically coupled to the third illumination assembly.

14. The apparatus of claim 13, wherein the first through ninth illumination devices are configured to produce the light having a same polarization.

15. The apparatus of claim 12, wherein:
wherein the first light has a first polarization and the second light has a second polarization, the second polarization different than the first polarization;
wherein the fourth light has the first polarization and the fifth light has the second polarization; and wherein the seventh light has the first polarization and the eighth light has the second polarization.

16. The apparatus of claim 12, further comprising:
a first polarizing beam splitter optically coupled to the first, second, and seventh, and eighth illumination devices and configured to reflect the first light and the second light and to be transmissive to the seventh light and the eighth light;
a first dichroic filter optically coupled to the third illumination device and to the first polarizing beam splitter and configured to reflect the third light and to be transmissive to the first light, second light, seventh light, and eighth light from the first polarizing beam splitter;
a second polarizing beam splitter optically coupled to sixth illumination device and the ninth illumination device and configured to reflect light from the sixth illumination device and to be transmissive to the ninth light; and
a second dichroic filter optically coupled to fourth and fifth illumination devices and to the second polarizing beam splitter and configured to reflect the fourth light and the fifth light and to be transmissive to the sixth light and the ninth light from the second polarizing beam splitter.

17. The apparatus of claim 12, further comprising:
a first dichroic filter optically coupled to the first, second, and ninth illumination devices and configured to reflect the first light and the second light and to be transmissive to the ninth light;
a first polarizing beam splitter optically coupled to the fifth, sixth, seventh, and eighth illumination devices and configured to reflect the fifth light and the sixth light and to be transmissive to the seventh light and the eighth light;
a second dichroic filter optically coupled to the fourth and to the first polarizing beam splitter and configured to reflect the fourth light and to be transmissive to the fifth light, the sixth light, the seventh light, and the eighth light from the first polarizing beam splitter; and
a second polarizing beam splitter optically coupled to the third illumination device and to the first dichroic filter and configured to reflect the third light and to be transmissive to first light, second light, and ninth light from the first dichroic filter.

18. A projection system, comprising:
a spatial light modulator; and
a light source configured to produce light to the spatial light modulator, the light source including:
  a housing having a first surface, a second surface opposite the first surface, and third surface coupled to the first and second surfaces;
  a first illumination device configured to produce first light, a second illumination device configured to produce second light, and a third illumination device configured to produce third light, the first, second, and third illumination devices arranged along the first surface, the first light having a first color, the second light having a second color, and the third light having a third color, the first color different than the second color and the third color, and the second color different than the third color;
  a fourth illumination device configured to produce fourth light, a fifth illumination device configured to produce fifth light, and a sixth illumination device configured to produce sixth light, the fourth, fifth, and sixth illumination devices arranged along the second surface, the fourth light having the first color, the fifth light having the second color, and the sixth light having the third color; and
  a light assembly arranged along the third surface, the light assembly configured to produce lights having the first, second, and third colors, respectively.

19. The projection system of claim 18, further comprising at least one optical combining element optically coupled to the first illumination device, to the second illumination device, to the third illumination device, to the fourth illumination device, to the fifth illumination device, and the sixth illumination device, the at least one optical combining element configured to direct the first light, the second light, the third light, the fourth light, the fifth light, and the sixth light in a direction away from the housing.

20. The projection system of claim 19, wherein the at least one optical combining element comprises a first chevron-shaped optical combining element and a second chevron-shaped optical combining element, the first chevron-shaped optical combining element includes one of a mirror, a polarizing beam splitter, or a dichroic filter, and the second chevron-shaped optical combining element includes another one of the mirror, polarizing beam splitter, or dichroic filter.

* * * * *